US011402078B2

(12) United States Patent
Hayashi et al.

(10) Patent No.: US 11,402,078 B2
(45) Date of Patent: Aug. 2, 2022

(54) LIGHT SOURCE DEVICE WITH SENSOR FOR DETECTING ANOMALY IN WAVELENGTH CONVERTING MEMBER

(71) Applicant: Panasonic Intellectual Property Management Co., Ltd., Osaka (JP)

(72) Inventors: Shintaro Hayashi, Hyogo (JP); Fumiya Yagi, Osaka (JP); Takeshi Abe, Osaka (JP); Toshiaki Takenaka, Osaka (JP); Shogo Motegi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/408,112

(22) Filed: Aug. 20, 2021

(65) Prior Publication Data

US 2022/0099272 A1    Mar. 31, 2022

(30) Foreign Application Priority Data

Sep. 29, 2020  (JP) .............................. JP2020-163657

(51) Int. Cl.
| F21V 9/32 | (2018.01) |
| F21V 5/00 | (2018.01) |
| F21V 5/04 | (2006.01) |
| F21V 9/30 | (2018.01) |
| F21V 8/00 | (2006.01) |

(52) U.S. Cl.
CPC ................ *F21V 5/008* (2013.01); *F21V 5/04* (2013.01); *F21V 9/30* (2018.02); *G02B 6/0006* (2013.01); *G02B 6/0008* (2013.01)

(58) Field of Classification Search
CPC ..... F21V 9/32; F21V 9/30; F21V 9/35; F21V 5/008; F21V 13/14
See application file for complete search history.

(56) References Cited

U.S. PATENT DOCUMENTS 5,838,451 A * 11/1998 McCarthy ................. G01J 3/10
                                                                    356/402
6,741,351 B2 * 5/2004 Marshall ............... G01J 1/4228
                                                                    356/406
(Continued)

FOREIGN PATENT DOCUMENTS

JP           5122542 B2    1/2013
JP           5677293 B2    2/2015
(Continued)

*Primary Examiner* — Ismael Negron
(74) *Attorney, Agent, or Firm* — Greenblum & Bernstein, P.L.C.

(57) ABSTRACT

A device includes a light source; a first lens for condensing light emitted by the light source; a member for converting at least a portion of the condensed light; a sensor for detecting light traveling from the member back towards the light source; and a second lens for directing light traveling back toward the light source to the sensor. The first lens includes a curved first face facing the light source, and a flat second face opposite the first face; the second lens has a curved third face facing away from the first lens and with a curvature different from a curvature of the first face of the first lens, and a flat fourth face facing the second face of the first lens. The second lens is provided between the first lens and the wavelength converting member.

10 Claims, 3 Drawing Sheets

(56) References Cited

U.S. PATENT DOCUMENTS

| | | | | |
|---|---|---|---|---|
| 7,312,430 | B2* | 12/2007 | Wong | H05B 45/00 |
| | | | | 250/239 |
| 7,473,879 | B2* | 1/2009 | Ng | H05B 45/22 |
| | | | | 250/239 |
| 7,652,236 | B2* | 1/2010 | Cortenraad | H05B 45/22 |
| | | | | 250/226 |
| 7,893,632 | B2* | 2/2011 | Meijer | G01J 1/04 |
| | | | | 362/335 |
| 7,950,832 | B2* | 5/2011 | Tanaka | H05B 45/22 |
| | | | | 362/803 |
| 8,445,824 | B2* | 5/2013 | Negley | F21V 23/0442 |
| | | | | 362/240 |
| 10,704,755 | B2* | 7/2020 | Hadrath | F21S 41/14 |
| 2006/0226336 | A1* | 10/2006 | York | G02B 6/4298 |
| | | | | 250/206 |
| 2009/0194670 | A1* | 8/2009 | Rains, Jr. | G01J 3/02 |
| | | | | 257/E33.076 |
| 2010/0001653 | A1* | 1/2010 | Hilgers | G01J 1/04 |
| | | | | 315/149 |
| 2010/0118543 | A1* | 5/2010 | Hong | F21V 23/0457 |
| | | | | 362/296.01 |
| 2011/0063115 | A1 | 3/2011 | Kishimoto | |
| 2011/0116520 | A1 | 5/2011 | Krijn et al. | |

FOREIGN PATENT DOCUMENTS

| | | |
|---|---|---|
| JP | 6505009 B2 | 4/2019 |
| WO | 2010/004477 A2 | 1/2010 |

* cited by examiner

LIGHT SOURCE DEVICE WITH SENSOR FOR DETECTING ANOMALY IN WAVELENGTH CONVERTING MEMBER

CROSS REFERENCE TO RELATED APPLICATION

This application claims the benefit of priority of Japanese Patent Application Number 2020-163657, filed on Sep. 29, 2020, the entire content of which is hereby incorporated by reference.

TECHNICAL FIELD

The present disclosure relates to a light source device.

BACKGROUND ART

Japanese Patent No. 5677293 (Patent Literature (PTL) 1) discloses a laser device that emits laser light, an optical system through which the laser light enters, a light conversion device that converts the laser light into yellow light, a beam splitter that reflects the yellow light produced by the light conversion device toward a converted light sensor, and the converted light sensor that measures the optical output power of the light reflected by the beam splitter.

SUMMARY

In conventional light source devices, a beam splitter causes light, on which wavelength conversion has been performed by a wavelength converting member that serves as a light conversion device, to reflect toward a sensor. By ensuring light condensing efficiency of the sensor as such, it is possible to ensure accuracy of the sensor detecting reflected light. However, an increase in the manufacturing cost of light source devices having the conventional configuration remains as a problem.

In view of the above, the present disclosure aims to provide a light source device that can ensure light condensing efficiency of a sensor, while reducing an increase in manufacturing cost.

A light source device according to an aspect of the present disclosure includes: an excitation light source that emits primary light; a first lens that condenses the primary light; a wavelength converting member that emits secondary light including the primary light and wavelength converted light, the wavelength converted light being at least some of the primary light on which wavelength conversion has been performed; a sensor that detects an anomaly in the wavelength converting member; and a second lens that condenses light which travels back toward the excitation light source, and causes the light to be incident on the sensor. The sensor detects the light which travels back toward the excitation light source via the second lens. The second lens is disposed between the wavelength converting member and the first lens. The first lens includes (i) a first face through which the primary light emitted by the excitation light source enters, and (ii) a second face opposite the first face from which the primary light that has entered from the first face and transmitted through an inside of the first lens exits. The second lens includes a third face through which the light which travels back toward the excitation light source enters. The third face has a curvature different from a curvature of the first face and the second face of the first lens.

A light source device according to the present disclosure can ensure light condensing efficiency of a sensor, while reducing an increase in manufacturing cost.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Figure 1:
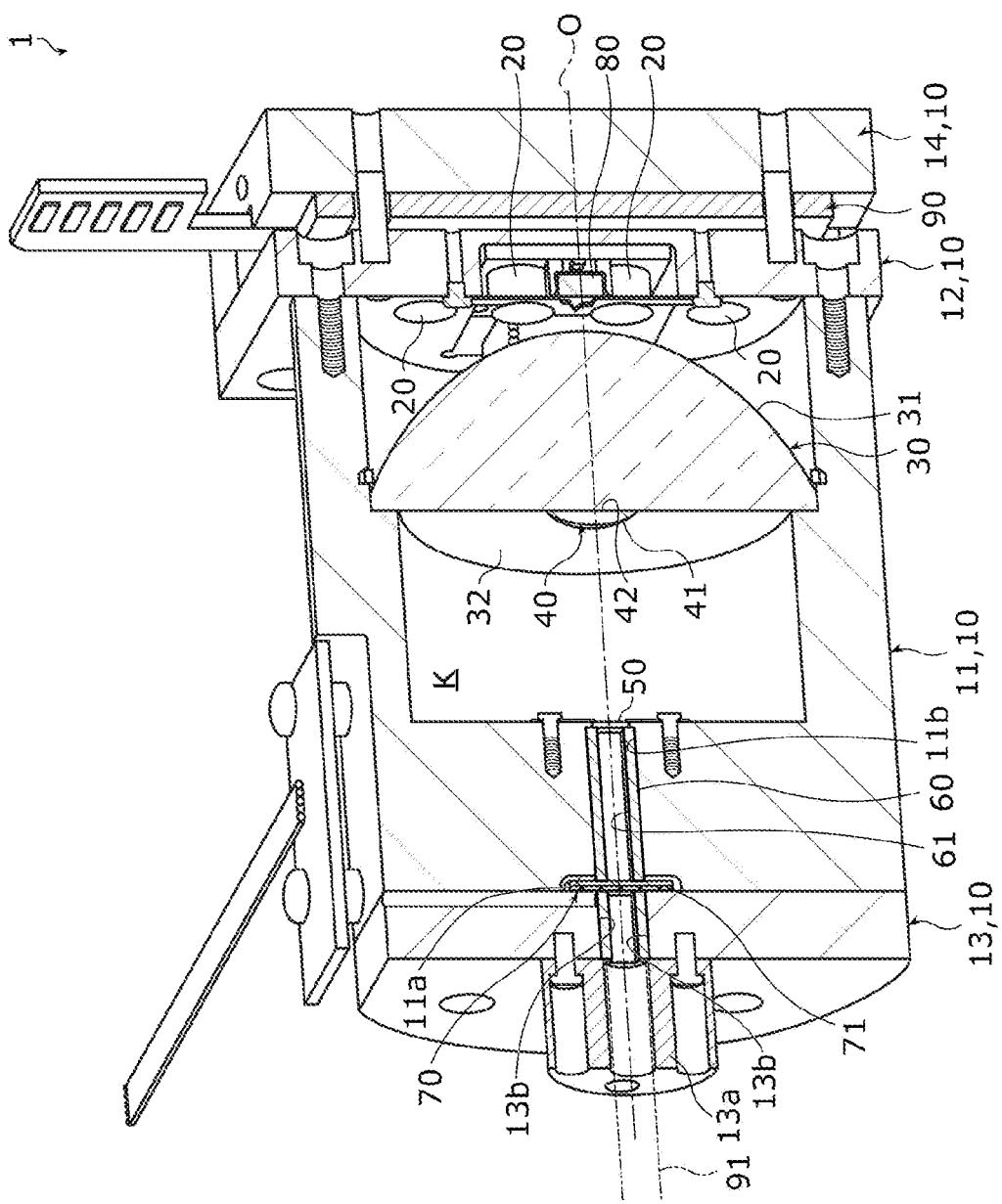
FIG. 1 is a cross sectional view exemplifying a light source device according to an embodiment.

Hereinafter, embodiments according to the present disclosure will be described with reference to the drawings. The embodiments described below each show a particular example of the present disclosure. Therefore, numerical values, shapes, materials, structural elements, the arrangement and connection of the structural elements, etc. presented in the embodiments below are mere examples and do not limit the present disclosure.

Furthermore, among the structural elements in the embodiments below, those not recited in any one of the independent claims will be described as optional structural elements.

Note that the drawings are schematic diagrams, and do not necessarily provide strictly accurate illustrations. Throughout the drawings, the same reference numeral is given to the same element. An expression, such as substantially parallel, is used in the embodiments below. The expression substantially parallel not only means that elements are perfectly parallel with each other, but also means that the elements are approximately parallel with each other, for example. In other words, the expression substantially parallel means to include a tolerance of about several percent, for example. In addition, the expression substantially parallel means parallel within a scope in which the present disclosure is capable of demonstrating advantageous effects. This also applies to other expressions using the term "substantially".

Hereinafter, a light source device according to the present disclosure will be described.

Embodiment

[Configuration of Light Source Device 1]

Figure 2:
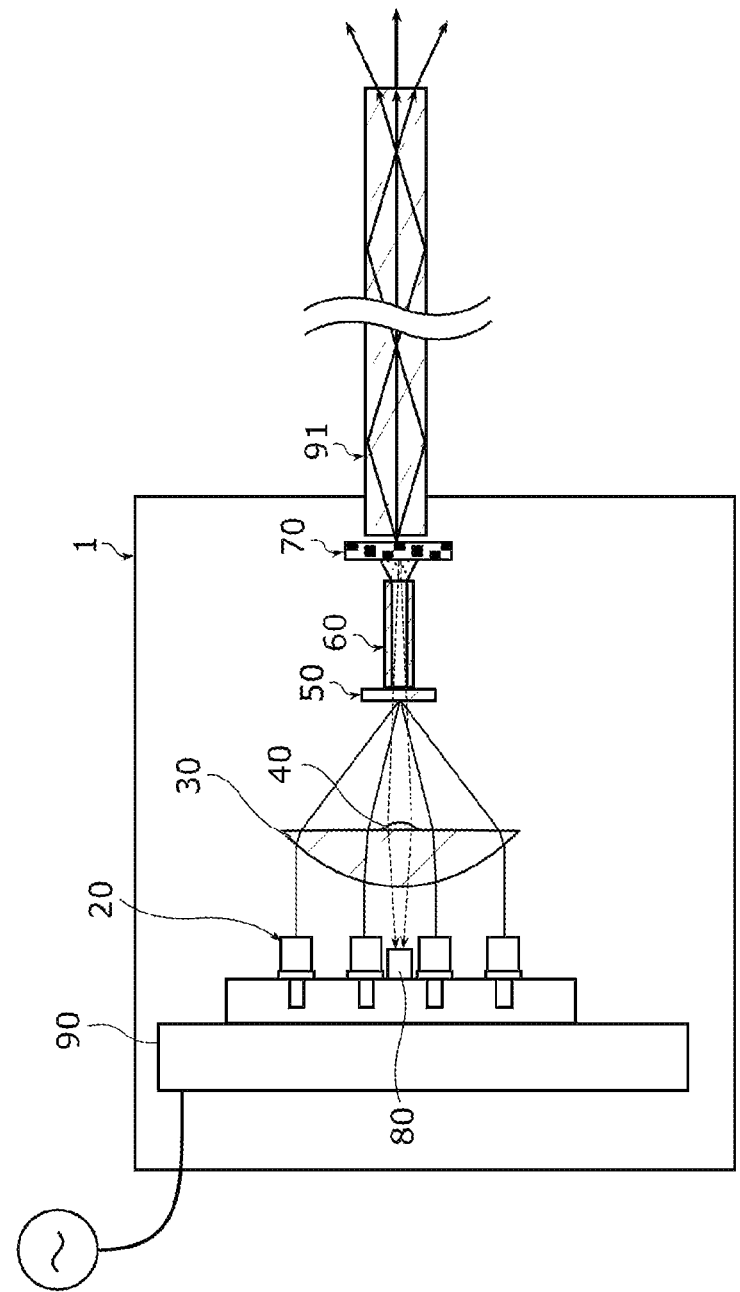
FIG. 2 is a schematic diagram exemplifying the light source device according to the embodiment.

FIG. 1 is a cross sectional view exemplifying light source device 1 according to an embodiment. FIG. 2 is a schematic diagram exemplifying light source device 1 according to the embodiment.

As illustrated in FIG. 1 and FIG. 2, light source device 1 is a lighting device that uses primary light. Light source device 1 is used in, for example, a lighting system for an endoscope, a projector, etc. Here, the primary light is excitation light, and is, for example, laser light. Note that light source device 1 may be used in a downlight, a spotlight, etc. In the embodiment, light source device 1 is connected with a connector provided in optical fiber 91 to configure a lighting system for an endoscope.

Light source device 1 emits primary light. In this embodiment, light source device 1 includes housing body 10, a plurality of excitation light sources 20, first lens 30, second lens 40, diffuser plate 50, light transmission body 60, fluorescent unit 70, sensor 80, and drive circuit 90. Here, light source device 1 that uses primary light is a device in which primary light enters fluorescent unit 70 from the back face (a face on the first lens 30 and second lens 40 side) of fluorescent unit 70, and wavelength converted light (fluorescence) on which wavelength conversion has been performed exits from the front face (a face on the optical fiber 91 side) of fluorescent unit 70.

[Housing Body 10]

Housing body 10 is an enclosure in the shape of a tube having closed ends, and extends in an anterior-posterior direction. Housing body 10 includes housing 11, support cover 12, first support 13, and second support 14.

Housing 11 is a case in the shape of a tube having one end (in a posterior direction) where opened space K is formed and the other end (in an anterior direction) which is substantially closed except for insertion hole 11b where light transmission body 60 etc. are disposed. Insertion hole 11b penetrates along the anterior-posterior direction of housing 11, and is disposed on center line O of first lens 30 which will be described later. Housing 11 accommodates, inside space K, first lens 30, second lens 40, diffuser plate 50, light transmission body 60, and fluorescent unit 70. In addition, recess 11a in which fluorescent unit 70 is disposed is formed on the first support 13 side (the other end) of housing 11. Recess 11a is connected to insertion hole 11b, and is formed on center line O of first lens 30. Note that housing 11 functions as a heat dissipation member for dissipating heat produced in excitation light sources 20 and fluorescent unit 70.

Support cover 12 supports excitation light sources 20 and sensor 80 such that excitation light sources 20 and sensor 80 are located opposite first lens 30. In addition, support cover 12 blocks an opening of housing 11.

First support 13 is disposed on the anterior side of housing 11, and is secured to housing 11 such that fluorescent unit 70 is interposed between first support 13 and housing 11. First support 13 includes through-hole 13b that extends from a face located opposite fluorescent unit 70. Secondary light including primary light which has diffusely transmitted through fluorescent unit 70 and wavelength converted light which is emitted by fluorescent unit 70 transmits through through-hole 13b.

First support 13 is provided with connecting terminal 13a for connecting with optical fiber 91. Connecting terminal 13a is disposed such that connecting terminal 13a and through-hole 13b overlap, and allows secondary light that has passed through through-hole 13b to pass through. Optical fiber 91 includes a light-guiding member, a connector that is mechanically connected with connecting terminal 13a of first support 13, a ferrule, etc. The light-guiding member is a transmission body having a dual structure in which a core having a high refractive index is surrounded with a clad layer having a refractive index lower than that of the core. For example, the light-guiding member includes a material, such as silica glass and plastic. The light-guiding member transmits secondary light, or in other words, wavelength converted light and primary light, which is emitted by wavelength converting member 71. The ferrule is an aligning component that holds the light-guiding member in an orientation facing fluorescent unit 70. The ferrule is inserted into the connector of optical fiber 91 when the connector of optical fiber 91 is connected to connecting terminal 13a. Accordingly, the light-guiding member and fluorescent unit 70 are disposed facing each other.

Second support 14 is disposed on the back face side of first support 13 such that driving circuit 90 is interposed between second support 14 and first support 13. Second support 14 is disposed so as to cover driving circuit 90 to protect driving circuit 90. Second support 14 is coupled to first support 13 with a fixing member such as a screw to be secured to housing 11.

In addition, each of support cover 12 and first support 13 is coupled to housing 11 with a fixing member such as a screw to be secured to housing 11. In this way, housing 11 is interposed between support cover 12 and first support 13.

[Excitation Light Source 20]

Each of excitation light sources 20 includes a semiconductor light-emitting element lens, and emits a collimated primary light. Excitation light sources 20 are attached to a substrate such that the optical axis of primary light emitted by each excitation light source 20 is substantially parallel to one another.

Excitation light sources 20 are disposed such that light is caused to enter first lens 30 from first face 31. Excitation light sources 20 emit primary light toward first lens 30 to cause the primary light to enter fluorescent unit 70 from the back face of fluorescent unit 70 via first lens 30 etc. Specifically, excitation light sources 20 and the substrate are secured to support cover 12 such that the optical axis of primary light intersects with first face 31 of first lens 30. In addition, excitation light sources 20 are thermally connected to support cover 12 via the substrate. The optical axis of primary light is an optical axis of primary light emitted by excitation light sources 20, and is substantially parallel to the anterior-posterior direction.

Note that although eight excitation light sources 20 are used in the embodiment, at least seven and at most nine excitation light sources 20 may be used. In addition, four excitation light sources 20 may be used in the embodiment. In this embodiment, four excitation light sources 20 are disposed in two columns, which totals eight excitation light sources 20. In this embodiment, primary light emitted by excitation light sources 20 has a predetermined wavelength within a wavelength band of from purple light to blue light.

In addition, although eight excitation light sources 20 are used as a single set of excitation light sources 20 in this embodiment, a plurality of sets of excitation light sources 20 may be used. In this case, first lens 30 and second lens 40 are provided per set of excitation light sources 20.

Although excitation light sources 20 each are a semiconductor laser which is, for example, an InGaN-based laser diode, each excitation light source 20 may be a semiconductor laser or a light emitting diode (LED) that emits light in a wavelength band other than the wavelength band of from purple light to blue light, so long as primary light emitted can excite wavelength converting member 71 of fluorescent unit 70.

Note that an output of primary light emitted by excitation light sources 20 is controlled by driving circuit 90. In addition, excitation light sources 20 may emit, as primary light, laser light that does not excite fluorescent unit 70.

[First Lens 30 and Second Lens 40]

First lens 30 and second lens 40 are light-transmissive lenses. First lens 30 condenses primary light emitted from excitation light sources 20, and causes the primary light to enter fluorescent unit 70 from the back face of fluorescent unit 70 via diffuser plate 50 etc. Second lens 40 condenses light which travels back toward excitation light sources 20, and causes condensed wavelength converted light and condensed primary light to be incident on sensor 80 via first lens 30. Here, the light which travels back toward excitation light sources 20 includes wavelength converted light and primary light which travel toward excitation light sources 20, but also includes, for example, reflected light reflected inside light source device 1, scattered light scattered inside light source device 1, wavelength converted light which is primary light on which wavelength conversion has been performed by wavelength converting member 71 of fluorescent unit 70, etc. That is, the light which travels back toward excitation light sources 20 is some of the reflected light, some of the scattered light, and some of the wavelength converted light.

First lens 30 and second lens 40 are disposed inside housing 11 such that first lens 30 and second lens 40 intersect with the optical axis of primary light emitted by excitation light sources 20. Specifically, first lens 30 is disposed inside housing 11 such that primary light emitted by excitation light sources 20 directly enters first lens 30. In other words, first lens 30 is disposed inside housing 11 such that the optical axis of primary light emitted by excitation light sources 20 is substantially parallel to center line O of first lens 30. Center line O of first lens 30 runs through the center of first lens 30, and is a straight line (the principal axis) substantially perpendicular to first face 31 and second face 32 of first lens 30. Second lens 40 is disposed between first lens 30 and fluorescent unit 70. In the embodiment, second lens 40 is disposed such that second lens 40 and a face (second face 32 which will be described later) of first lens 30 on the fluorescent unit 70 side overlap. In the embodiment, second lens 40 is disposed such that second lens 40 intersects with center line O of first lens 30. In addition, second lens 40 is disposed such that second lens 40 adheres to first lens 30. In the embodiment, second lens 40 is a lens different from and separable from first lens 30. Second lens 40 may be disposed apart from first lens 30.

First lens 30 includes first face 31 and second face 32. First lens 30 is a convex lens whose first face 31 is a curved face and whose second face 32 is a plane face. First face 31 is a face which is located opposite excitation light sources 20 and through which primary light emitted by excitation light sources 20 directly enters. Second face 32 is a face opposite first face 31 (a face located opposite diffuser plate 50) from which primary light that has entered from first face 31 and transmitted through the inside of first lens 30 exits. In this embodiment, first face 31 is in the shape of a hemisphere.

Second lens 40 is a convex lens including third face 41 and fourth face 42 opposite third face 41. Third face 41 is a face located opposite diffuser plate 50 through which light which travels back toward excitation light sources 20 directly enters. In this embodiment, third face 41 is in the shape of a hemisphere. The curvature of third face 41 of second lens 40 through which light which travels back toward excitation light sources 20 enters is different from the curvature of first face 31 and second face 32 of first lens 30. In other words, the curvature of third face 41 is greater than or less than the curvature of first face 31. Fourth face 42 has a plane face that meets second face 32. In this embodiment, fourth face 42 adheres to second face 32.

Second lens 40 is disposed between fluorescent unit 70 and first lens 30, and is not disposed between first lens 30 and sensor 80. Second lens 40 is disposed on first lens 30 such that fourth face 42 and second face 32 adhere to each other. Second lens 40 is disposed on center line O of first lens 30.

In addition, second lens 40 has transmittance of wavelength converted light higher than transmittance of primary light. In other words, second lens 40 transmits an amount of wavelength converted light which travels back toward excitation light sources 20 greater than an amount of primary light which transmits through first lens 30 and primary light which travels back toward excitation light sources 20.

In addition, first lens 30 and second lens 40 are disposed symmetrical about center line O. In other words, each of first lens 30 and second lens 40 has line symmetry about center line O. Specifically, since first lens 30 and second lens 40 have a dome shape, a hemispherical shape, etc., second lens 40 is disposed so as to be symmetrical about center line O of first lens 30. In other words, second lens 40 is disposed on second face 32 of first lens 30 such that the principal axis of second lens 40 matches with center line O of first lens 30. Although not illustrated, when first lens 30 and second lens 40 are seen along a direction in which first lens 30 and second lens 40 are aligned (the anterior-posterior direction), the outer perimeter of first lens 30 is concentric with the outer perimeter of second lens 40.

Note that first lens 30 and second lens 40 each in this embodiment are a convex lens, but are not limited to a convex lens so long as first lens 30 and second lens 40 each are an optical device capable of condensing primary light and causing the primary light to enter an end face of optical fiber 91. For example, first lens 30 and second lens 40 each may be a prism, a concave mirror, a diffraction grating, etc.

[Diffuser Plate 50]

Diffuser plate 50 is disposed between light transmission body 60, and first lens 30 and second lens 40, and is disposed so as to intersect with center line O of first lens 30. Specifically, diffuser plate 50 overlaps light transmission body 60, and is disposed so as to block an end portion of housing 11 and an opening on the posterior side of light transmission body 60. Diffuser plate 50 is an optical member in the shape of a plate which diffuses primary light condensed by first lens 30, and allows the primary light to transmit through.

Diffuser plate 50 includes an entrance face through which primary light enters, and an exit face opposite the entrance face from which the primary light that has been diffused by diffuser plate 50 and transmitted through diffuser plate 50 exits. The entrance face of diffuser plate 50 is located opposite first lens 30 and second lens 40, and is substantially orthogonal to center line O of first lens 30. The exit face of diffuser plate 50 is located opposite light transmission body 60, and is substantially orthogonal to center line O of first lens 30.

From the viewpoint of laser resistance, diffuser plate 50 in this embodiment includes an inorganic material, or particularly, inorganic glass. Note that diffuser plate 50 may include, for example, a light-transmissive material, such as acrylic and polycarbonate.

From the viewpoint of laser resistance, diffuser plate 50 has a glass surface on which diffusion processing is performed to display light diffusion characteristics in this embodiment. Alternatively, diffuser plate 50 may have a transparent panel whose surface is finely textured (embossments and microprisms) by imparting, to the surface, surface treatment such as emboss processing or laser machining, or may have a transparent panel on which a dot pattern is printed or etched to display light diffusion characteristics. Furthermore, an anti-reflective (AR) coating may be applied on the entrance face and the exit face of diffuser plate 50 for the purpose of reducing loss of light. From the viewpoint of laser resistance, it is desirable that the AR coating is an inorganic film. In addition, it is desirable that the AR coating is a multilayer film from the viewpoint of transmittance, but the AR coating may be an inexpensive single layer film. Note that diffuser plate 50 may be a translucent diffuser plate in which a light dispersing agent (light scattering material) is dispersed inside glass.

In this embodiment, the exit face of diffuser plate 50 has better light diffusion characteristics than the entrance face to diffuse primary light that has transmitted through diffuser plate 50, for example. Note that the exit face may have better light diffusion characteristics than the entrance face, or both the exit face and the entrance face may have good light diffusion characteristics.

[Light Transmission Body 60]

Light transmission body 60 is a light pipe or a beam homogenizer which includes glass as a base material, and has an inner surface that is coated with a dielectric multi-layer so as to efficiently reflect primary light. When light transmission body 60 is cut across a plane orthogonal to the lengthwise direction of light transmission body 60, the outer perimeter of a cross section of light transmission body 60 is in the shape of a polygon. In this embodiment, the outer perimeter of the cross section is in the shape of a square. In this case, four pieces of glass plates are joined together to configure light transmission body 60.

Note that light transmission body 60 may be a metal light pipe having the inner surface to which a coating that efficiently reflects a laser wavelength is applied. Note that light transmission body 60 may be a glass rod including a light-transmissive material such as glass.

Light transmission body 60 is accommodated inside housing 11. Light transmission body 60 is disposed in a state in which light transmission body 60 is inserted into insertion hole 11b which extends across from the end portion inside housing 11 to a face on the first support 13 side to be supported by housing 11. Light transmission body 60 is disposed inside housing 11 such that the central axis of light transmission body 60 substantially matches with the above-described center line O. Light transmission body 60 is disposed, inside housing 11, such that light transmission body 60 is interposed between diffuser plate 50 and wavelength converting member 71.

In addition, light transmission body 60 includes transmission path 61 through which primary light diffused by diffuser plate 50 transmits. Light transmission body 60 emits primary light that has passed through transmission path 61. When transmission path 61 is cut across a plane orthogonal to a direction in which primary light is transmitted, the outer perimeter of a cross section of transmission path 61 included in light transmission body 60 is in the shape of a polygon. Since primary light that is guided through the inside of light transmission body 60 repeatedly reflects inside light transmission body 60 while being transmitted through the inside of light transmission body 60 when transmission path 61 included in light transmission body 60 is in the shape of a polygon, the primary light transmitted through the inside of light transmission body 60 is readily mixed. Since primary light transmits through transmission path 61 while being mixed, light transmission body 60 can emit mixed primary light (tophat primary light) toward fluorescent unit 70.

Transmission path 61 is a space from an opening on the posterior side of light transmission body 60 to an opening of the anterior side of light transmission body 60, and allows primary light to pass through. The opening on the posterior side of light transmission body 60 is an opening located opposite the exit face of diffuser plate 50, and is covered by diffuser plate 50. The opening on the anterior side of light transmission body 60 is an opening located opposite fluorescent unit 70, and is covered by fluorescent unit 70.

[Fluorescent Unit 70]

Fluorescent unit 70 is phosphor (optical member) which converts primary light mixed by light transmission body 60 into wavelength converted light. Specifically, fluorescent unit 70 in the shape of a plate emits the wavelength converted light, while diffusing primary light condensed by first lens 30 and allowing the primary light to transmit through.

Fluorescent unit 70 performs wavelength conversion on primary light that has entered from the back face of fluorescent unit 70, and emits the primary light on which the wavelength conversion is performed from the front face of fluorescent unit 70. More specifically, primary light that has transmitted through light transmission body 60 enters fluorescent unit 70 from the back face of fluorescent unit 70. In this embodiment, the intensity distribution of light that enters fluorescent unit 70 from the back face of fluorescent unit 70 is uniform, and is substantially uniform on an illumination face illuminated by primary light. Fluorescent unit 70 performs wavelength conversion on primary light that has entered from the back face of fluorescent unit 70, and emits the primary light on which the wavelength conversion is performed from the front face of fluorescent unit 70.

Fluorescent unit 70 is disposed between housing 11 and first support 13 in a state in which fluorescent unit 70 is in contact with housing 11 and first support 13. Fluorescent unit 70 is disposed between light transmission body 60 and first support 13, and is disposed in and secured to recess 11a formed in housing 11 so as to intersect with center line O of first lens 30. In other words, fluorescent unit 70 is disposed so as to overlap light transmission body 60 and to block the opening on the anterior side of light transmission body 60.

Fluorescent unit 70 is a flat plate. In this embodiment, fluorescent unit 70 includes, for example, an anti-reflective (AR) layer, a light transmitter, a dichroic mirror, and wavelength converting member 71 (phosphor layer). Fluorescent unit 70 has a multilayered structure in which the AR layer, the light transmitter, the dichroic mirror, and wavelength converting member 71 are stacked in the stated order.

The AR layer is stacked on the back face (a face on the light transmission body 60 side) of the light transmitter. The AR layer allows primary light to effectively transmit through toward the light transmitter, thereby improving light efficiency.

The light transmitter is a light-transmissive substrate, and includes sapphire, for example. Note that a sapphire substrate having high thermal conductivity is used for the light transmitter, but the light transmitter is not limited to the sapphire substrate. Instead of the sapphire substrate, a transparent substrate such as glass may be used as the light transmitter.

The dichroic mirror is a dielectric multilayer including $FMg$, $SiO_2$, $TiO_2$, etc. For example, the dichroic mirror allows primary light in a wavelength band of from blue light to purple light to transmit through, and reflects light in wavelength bands other than the wavelength band of from blue light to purple light. The dichroic mirror is stacked on the front face (a face on the first support 13 side) of the light transmitter. The dichroic mirror allows the primary light to efficiently transmit through, and reflects wavelength converted light.

In addition, although the dichroic mirror is provided for causing wavelength converted light to travel toward optical fiber 91, or in other words, is provided for improving the optical extraction efficiency of the wavelength converted light, the dichroic mirror may allow light in a particular wavelength band to travel back toward excitation light sources 20. For example, the dichroic mirror may allow light in a wavelength band of red light, blue light, etc. to travel back toward excitation light sources 20.

Wavelength converting member 71 includes phosphor that emits wavelength converted light according to primary light. The phosphor is dispersed and kept in a binder which is a transparent material including, for example, ceramic such as glass or silicon resin. Wavelength converting member 71 is, for example, an yttrium aluminum garnet (YAG)-based phosphor, a CASN-based phosphor, an SCASN-based phosphor, or a barium (Ba), aluminum (Al), magnesium (Mg) (BAM)-based phosphor. The type of phosphor can be selected as appropriate according to a type of primary light. Note that the binder is not limited to ceramic or silicon resin. The binder may include other transparent materials such as transparent glass, etc.

Wavelength converting member 71 emits secondary light including primary light and wavelength converted light which is at least some of the primary light on which wavelength conversion is performed. Specifically, wavelength converting member 71 emits secondary light including primary light and wavelength converted light by (i) emitting wavelength converted light, which is some of primary light transmitted through light transmission body 60 on which wavelength conversion is performed by wavelength converting member 71, and (ii) allowing the rest of the primary light on which wavelength conversion is not performed to diffusely pass through wavelength converting member 71.

In addition, wavelength converting member 71 may be, for example, a red phosphor, a green phosphor, a blue phosphor, etc., and may emit wavelength converted light, such as red light, green light, and blue light, according to primary light. In this case, these wavelength converted lights of red light, green light, and blue light may be combined to produce white light.

In this embodiment, wavelength converting member 71 emits quasi-white wavelength converted light produced by combining (i) green to yellow wavelength converted light produced by wavelength converting member 71 absorbing some of blue primary light emitted from excitation light sources 20, and (ii) the blue primary light exited from wavelength converting member 71 without being absorbed by wavelength converting member 71. Note that in the case where excitation light sources 20 emit blue primary light, wavelength converting member 71 may include several types of phosphors which absorb some of the blue primary light and convert the some of blue primary light into green to yellow wavelength converted light.

Note that wavelength converting member 71 has thermal quenching characteristics that display a decrease in wavelength conversion efficiency when temperature rises. Since a loss involved in wavelength conversion turns into heat, it is important to ensure heat dissipation of wavelength converting member 71. Accordingly, it is desirable that fluorescent unit 70 is in contact with each of housing 11 and first support 13 for readily dissipating heat produced in wavelength converting member 71 via the sapphire substrate, etc.

[Sensor 80]

Sensor 80 detects an anomaly in wavelength converting member 71 of fluorescent unit 70. Specifically, sensor 80 detects an anomaly in wavelength converting member 71 of fluorescent unit 70 from light which travels back toward excitation light sources 20 and condensed by second lens 40. Although the light which travels back toward excitation light sources 20 includes primary light and wavelength converted light, second lens 40 and first lens 30 mainly condense the wavelength converted light since second lens 40 has transmittance of wavelength converted light higher than transmittance of primary light. Accordingly, sensor 80 detects condensed wavelength converted light condensed by second lens 40 and first lens 30. Here, an anomaly in wavelength converting member 71 is, for example, damage to fluorescent unit 70, a leak of primary light, and a failure to provide fluorescent unit 70 in housing 11. Sensor 80 outputs, to a control device, information indicating light which has traveled back toward excitation light sources 20 and has been detected.

The control device determines an anomaly in wavelength converting member 71, namely, fluorescent unit 70, based on the information obtained from sensor 80 which indicates light which has traveled back toward excitation light sources 20. For example, when the control device determines the presence of an anomaly in fluorescent unit 70 based on the information indicating light which has traveled back toward excitation light sources 20, the control device may deactivate excitation light sources 20, or may notify those around light source device 1 of the information indicating the presence of an anomaly in fluorescent unit 70. For example, the control device may stop electric power supplied to excitation light sources 20 by controlling a drive controller. In addition, when the control device determines the absence of an anomaly in fluorescent unit 70 based on the information indicating light which has traveled back toward excitation light sources 20, the control device need not provide a notification, or may notify those around light source device 1 of information indicating that fluorescent unit 70 is normal. As described above, the control device can monitor the state of fluorescent unit 70 of light source device 1.

Sensor 80 is disposed on the first face 31 side of first lens 30. In addition, sensor 80 is disposed on center line O of first lens 30. In other words, a light-receiving surface of sensor 80 is orthogonal to center line O of second lens 40, and is disposed on support cover 12 such that sensor 80 is located opposite first face 31 of first lens 30. In this embodiment, an outer perimeter collectively defined by the eight excitation light sources 20 is in the shape of an approximate quadrilateral when the eight excitation light sources 20 are seen along the optical axis of light emitted by each of the eight excitation light sources 20. Sensor 80 is disposed in a location overlapping an approximate center of the approximate quadrilateral.

Sensor 80 includes a photodiode, and a light receiving element of an image sensor etc. which is capable of receiving a signal. An amplifier circuit for receiving an analog signal by the light receiving element, and a circuit for converting the received analog signal into a digital signal may be connected to sensor 80.

[Drive Circuit 90]

Drive circuit 90 is electrically connected with an electric power system via an electric power line etc. Drive circuit 90 supplies electric power to each of excitation light sources 20 and sensor 80. In addition, each excitation light source 20 outputs light under the control of drive circuit 90 such that each excitation light source 20 emits primary light.

Drive circuit 90 may have a function of dimming primary light emitted by each excitation light source 20. In addition, drive circuit 90 may include, for example, an oscillator that drives each excitation light source 20 based on a pulse signal.

[Other Configurations]

Light source device 1 may be connected to a lighting device for emitting, as illumination light, secondary light transmitted via optical fiber 91. The lighting device may include, for example, a stainless-steel fiber coupling, a glass lens, an aluminum holder, and an aluminum enclosure.

[Operation]

In such light source device 1, primary light emitted from each excitation light source 20 enters first lens 30 from first face 31, transmits through first lens 30, and exits from second face 32. The condensed primary light enters diffuser plate 50 from the entrance face of diffuser plate 50. The primary light that has entered diffuser plate 50 from the entrance face of diffuser plate 50 diffusely exits from the exit face of diffuser plate 50 by transmitting through diffuser plate 50. The primary light then transmits through transmission path 61 of light transmission body 60, and enters fluorescent unit 70. Some of the primary light that has entered fluorescent unit 70 is absorbed by wavelength converting member 71 and exits from fluorescent unit 70 as wavelength converted light, and the rest of the primary light transmits through fluorescent unit 70, without wavelength conversion being performed. The wavelength converted light and the primary light which have exited from fluorescent unit 70 enter the light-guiding member of optical fiber 91, are guided through optical fiber 91 to a distal end portion of optical fiber 91, and exit from the distal end portion. The light exited from the distal end portion can illuminate a predetermined location.

[Experimental Result]

Figure 3A:
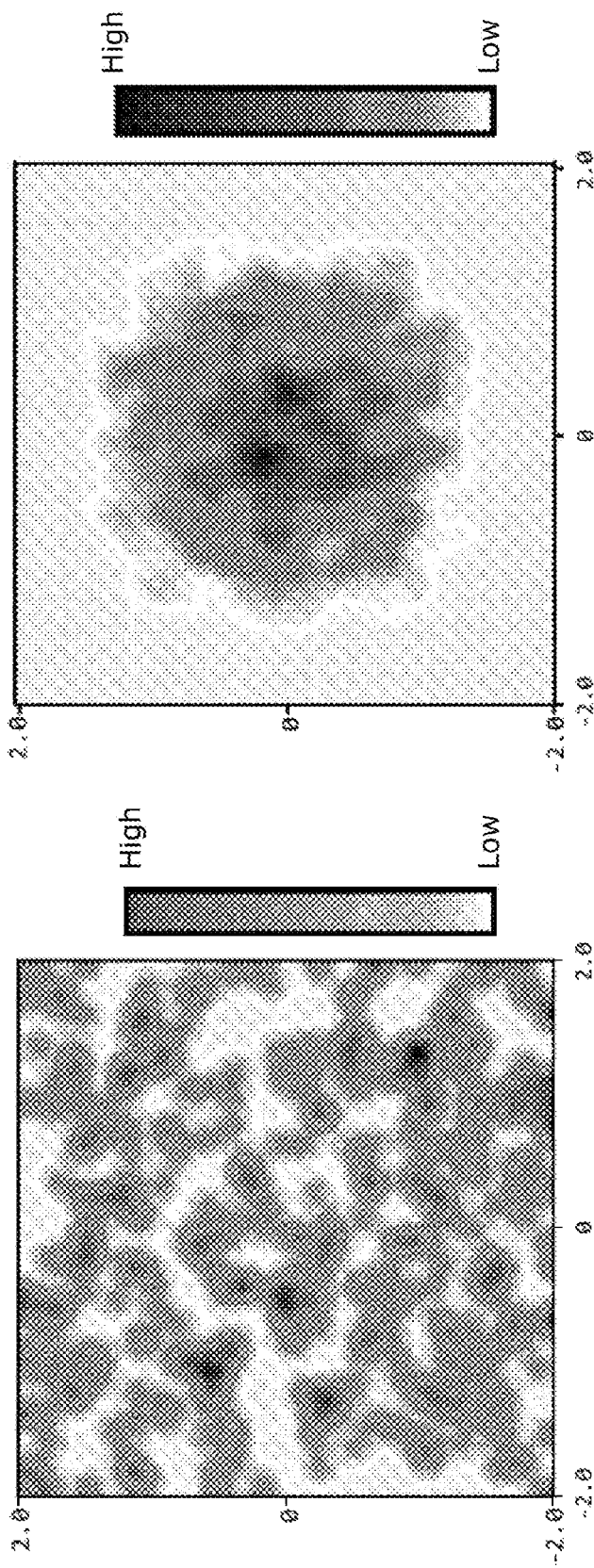
FIG. 3(a) illustrates (i) a diagram exemplifying, using a light source device which includes only a first lens, irradiance of light which has traveled back toward excitation light sources and is incident on a light-receiving surface of the sensor.
Figure 3B:
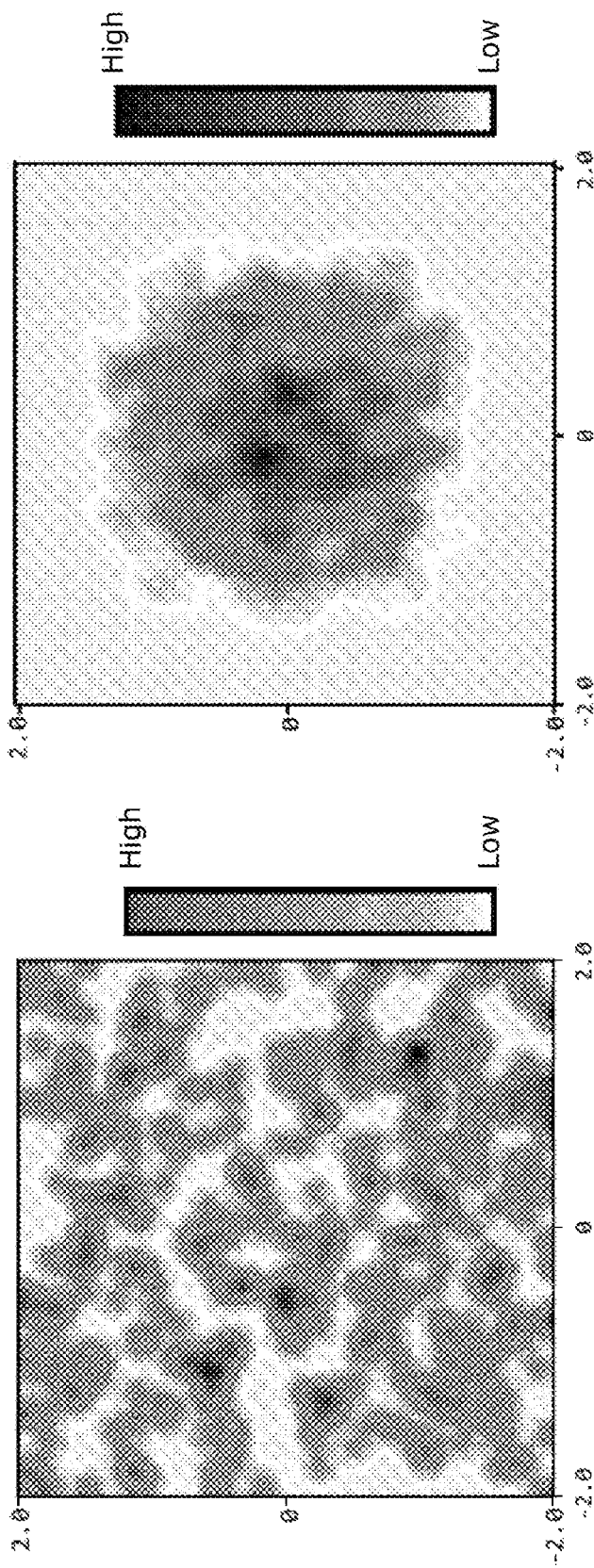
FIG. 3(b) illustrates (ii) a diagram exemplifying, using the light source device according to the embodiment which includes a first lens and a second lens, irradiance of light which has traveled back toward excitation light sources and is incident on a light-receiving surface of the sensor.

FIG. 3(a) illustrates (i) a diagram exemplifying, using a light source device which includes only first lens 30, irradiance of light which has traveled back toward excitation light sources 20 and is incident on the light-receiving surface of sensor 80, and FIG. 3(b) illustrates (ii) a diagram exemplifying, using light source device 1 according to the embodiment which includes first lens 30 and second lens 40, irradiance of light which has traveled back toward excitation light sources 20, and is incident on the light-receiving surface of sensor 80.

The experiment is carried out using eight excitation light sources 20 each of which includes a collimator lens. The eight excitation light sources 20 are packaged as a single set, and secured to support cover 12. The eight excitation light sources 20 are disposed at an attachment pitch of 11 mm. Primary light emitted by excitation light sources 20 has a wavelength of 455 nm and an output of 6 W to 20 W. First lens 30 is an aspherical lens including a plane face (second face 32) and a convex face (first face 31). First lens 30 has the focal length of 50 mm, the diameter of 50 mm, the curvature of 21, and the thickness of 21 mm. First lens 30 includes crown glass as a material. First lens 30 includes first face 31 on which an AR coating for a wavelength of 455 nm is applied. Second lens 40 has the focal length of 12.4 mm and the curvature of 6.5. Second lens 40 includes crown glass as a material. Second lens 40 includes third face 41 on which an AR coating for a wavelength of 550 nm is applied. In addition, diffuser plate 50 is made of Pyrex (registered trademark) glass having uneven surface to diffuse primary light. The haze value of diffuser plate 50 is 50%. Diffuser plate 50 includes two faces on each of which an AR coating for a wavelength of from 440 nm to 650 nm is applied. Furthermore, light transmission body 60 is a hollow beam homogenizer in which four pieces of glass plates on each of which a visible light reflective coating is applied are joined together. Moreover, fluorescent unit 70 includes a dichroic mirror, a sapphire substrate on which an AR coating is applied, wavelength converting member 71, etc. Wavelength converting member 71 is an YAG phosphor or a multicolor phosphor containing ZnO, etc. The dichroic mirror is configured to reflect wavelength converted light toward the anterior direction, but allows about 3% of entire light having wavelength of 550 nm to transmit in the posterior direction for wavelength converted light to travel back toward sensor 80. Sensor 80 includes a photodiode (ROHM BH1603FVC), and a filter (HOYA yellow long path filter) in front of the photodiode. Sensor 80 is disposed in the center of the eight excitation light sources 20 which are packaged as a single set. Sensor 80 includes a variable resistor for gain control on a substrate on which the photodiode is attached.

As illustrated in FIG. 3(a), the light-receiving surface of sensor 80 in light source device 1 which includes only first lens 30 and does not include second lens 40 is dappled with light incident on the light-receiving surface. In other words, the light is not condensed.

As illustrated in FIG. 3(b), light is concentrated at one location, and is condensed onto the light-receiving surface of sensor 80 in light source device 1 according to the embodiment which includes first lens 30 and second lens 40.

From the above, it is evident that light source device 1 according to the embodiment which includes first lens 30 and second lens 40 has a greater effect of condensing light onto the light-receiving surface of sensor 80 than light source device 1 including only first lens 30.

Advantageous Effects

Next, advantageous effects of light source device 1 according to the embodiment will be described.

As has been described above, light source device 1 according to the embodiment includes: excitation light source 20 that emits primary light; first lens 30 that condenses the primary light; wavelength converting member 71 that emits secondary light including the primary light and wavelength converted light which is at least some of the primary light on which wavelength conversion has been performed; sensor 80 that detects an anomaly in wavelength converting member 71; and second lens 40 that condenses light which travels back toward excitation light source 20, and causes the light to be incident on sensor 80. Sensor 80 detects the light which travels back toward excitation light source 20 via second lens 40. Second lens 40 is disposed between wavelength converting member 71 and first lens 30. First lens 30 includes (i) first face 31 through which the primary light emitted by excitation light source 20 enters, and (ii) second face 32 opposite first face 31 from which the primary light that has entered from first face 31 and transmitted through an inside of first lens 30 exits. Second lens 40 includes third face 41 through which the light which travels back toward excitation light source 20 enters. Third face 41 has a curvature different from a curvature of first face 31 and second face 32 of first lens 30.

Unlike conventional light sources that includes a beam splitter between a first lens and a wavelength converting member, the light source device according to the embodiment includes second lens 40 that can condense light which has traveled back toward excitation light sources 20 and can cause the light condensed by second lens 40 to be incident on sensor 80. In addition, second lens 40 can directly condense wavelength converted light which has traveled back toward excitation light sources 20. Accordingly, as compared to the case in which second lens 40 is disposed between first lens 30 and sensor 80, light is readily incident on sensor 80 in light source device 1.

Therefore, light source device 1 can ensure light condensing efficiency of sensor 80, while reducing an increase in manufacturing cost.

Particularly, it is possible to increase accuracy of sensor 80 detecting an anomaly in wavelength converting member 71, since the light condensing efficiency of sensor 80 can be ensured. Consequently, it is possible to improve the safety of light source device 1.

In addition, in light source device 1 according to the embodiment, second lens 40 is a lens different from and separable from first lens 30, and is disposed on center line O of first lens 30.

The separate manufacturing of first lens 30 and second lens 40 can reduce an increase in the cost of manufacturing first lens 30 and second lens 40. In other words, it is possible to reduce an increase in the cost of manufacturing light source device 1. Particularly, if first lens 30 and second lens 40 each have a typical shape adaptable to a wide variety of applications, it is possible to effectively reduce an increase in the cost of manufacturing first lens 30 and second lens 40.

In addition, in light source device 1 according to the embodiment, first lens 30 and second lens 40 are disposed symmetrical about center line O of first lens 30.

With this, it is possible to readily manufacture first lens 30 and second lens 40.

In addition, in light source device 1 according to the embodiment, sensor 80 is disposed on center line O of first lens 30.

With this, it is possible to dispose second lens 40 at a location in which light which travels back toward excitation light sources 20 is likely to be concentrated. Accordingly, second lens 40 can condense a great amount of light to be incident on sensor 80. This makes it possible to improve accuracy of sensor 80 detecting an anomaly in wavelength converting member 71.

In addition, in light source device 1 according to the embodiment, second lens 40 has transmittance of the wavelength converted light higher than transmittance of the primary light.

With this, it is possible for light source device 1 to improve an S/N ratio for sensor 80 to detect an anomaly in wavelength converting member 71, since wavelength converted light out of the wavelength converted light and primary light which travel back toward excitation light sources 20 can be selectively condensed.

In addition, in light source device 1 according to the embodiment, first lens 30 is a convex lens whose first face 31 is a curved face and whose second face 32 is a plane face. Moreover, second lens 40 is a convex lens including fourth face 42 opposite third face 41. Fourth face 42 is a plane face which meets second face 32.

As described above, each of second face 32 and fourth face 42 has a plane face, and thus second face 32 of first lens 30 and fourth face 42 of second lens 40 readily overlap. Accordingly, it is possible to readily align second lens 40 relative to first lens 30. Since second lens 40 is readily arranged on first lens 30, it is possible to assemble first lens 30 and second lens 40 without great difficulty.

In addition, in light source device 1 according to the embodiment, sensor 80 is disposed on the first face 31 side of first lens 30. Second lens 40 is disposed on first lens 30 such that fourth face 42 and second face 32 adhere to each other, and is not disposed between first lens 30 and sensor 80.

With this, it is unlikely that an air layer is formed between fourth face 42 and second face 32. Accordingly, a great amount of wavelength converted light condensed by second lens 40 can be incident on sensor 80 in light source device 1. In other words, it is possible to ensure light condensing efficiency of sensor 80.

In addition, in light source device 1 according to the embodiment, second lens 40 is disposed such that second lens 40 directly or indirectly faces wavelength converting member 71.

In addition, light source device 1 according to the embodiment includes: a plurality of excitation light sources 20 that emit primary light; first lens 30 that condenses the primary light; wavelength converting member 71 through which the primary light condensed by first lens 30 enters and which emits secondary light including the primary light and wavelength converted light which is at least some of the primary light on which wavelength conversion has been performed; sensor 80 that detects an anomaly in wavelength converting member 71; and second lens 40 that condenses light which travels back from the wavelength converting member 71 side toward the plurality of excitation light sources 20, and causes the light to be incident on sensor 80. Sensor 80 detects the light which travels back from the wavelength converting member 71 side toward the plurality of excitation light sources 20 via second lens 40 and first lens 30, and outputs information indicating the light detected to a control device. The plurality of excitation light sources 20 are disposed near sensor 80. Second lens 40 is disposed between wavelength converting member 71 and first lens 30. First lens 30 includes (i) first face 31 through which the primary light emitted by the plurality of excitation light sources 20 enters, and (ii) second face 32 opposite first face 31 from which the primary light that has entered from first face 31 and transmitted through an inside of first lens 30 exits. Second lens 40 includes third face 41 through which the light which travels back from the wavelength converting member 71 side toward the plurality of excitation light sources 20 enters. Third face 41 has a curvature different from a curvature of first face 31 and second face 32 of first lens 30.

Variations, etc.

The present disclosure has been described as above based on the embodiment, but the present disclosure is not limited thereto.

For example, light source device 1 according to the embodiment may include second lens 40 and first lens 30 which are integrally joined together such that second lens 40 and first lens 30 are inseparable. For example, second lens 40 and first lens 30 may be manufactured in a state in which second lens 40 is integrated with first lens 30. That is to say, second lens 40 may be integrally joined to first lens 30, and may be disposed on center line O of first lens 30

With this, it is possible to save time and efforts on assembling second lens 40 relative to first lens 30, since second lens 40 is integrated with first lens 30.

In addition, in light source device 1 according to the embodiment, first lens 30 and second lens 40 are disposed symmetrical about center line O of first lens 30.

If a second lens is disposed asymmetrical about the center line with respect to a first lens when the first lens and the second lens are integrally joined together, it is difficult to integrally manufacture the first lens and the second lens, thereby increasing the manufacturing cost. However, since a first lens and a second lens can be readily manufactured according to the embodiment, it is possible to reduce an increase in the manufacturing cost.

The present disclosure also encompasses: embodiments achieved by applying various modifications conceivable to those skilled in the art to each of embodiments and variations; and embodiments achieved by optionally combining the structural elements and the functions of each embodiment and variation without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light source device, comprising:
   an excitation light source that emits primary light;
   a first lens that condenses the primary light, the first lens including a first face through which the primary light enters, and a second face opposite the first face from which the primary light that has entered from the first face and transmitted through an inside of the first lens exits;
   a wavelength converting member that emits secondary light including the primary light and wavelength converted light, the wavelength converted light being at least some of the primary light on which wavelength conversion has been performed;
   a sensor; and
   a second lens disposed between the wavelength converting member and the first lens, the second lens including a third face having a curvature different from a curvature of the first face and the second face of the first lens, light which travels back toward the excitation light source entering the third face and being condensed and directed to be incident on the sensor,
   wherein the sensor receives the light which travels back toward the excitation light source via the second lens to detect an anomaly in the wavelength converting member.

2. The light source device according to claim 1, wherein the second lens is:
   integrally joined to the first lens; and
   disposed on a center line of the first lens.

3. The light source device according to claim 1, wherein the second lens has transmittance of the wavelength converted light higher than transmittance of the primary light.

4. The light source device according to claim 1, wherein the second lens is disposed such that the second lens directly or indirectly faces the wavelength converting member.

5. The light source device according to claim 1, wherein the first lens is a convex lens, wherein the first face is a curved face and the second face is a plane face,
   the second lens is a convex lens including a fourth face opposite the third face, and
   the fourth face is a plane face which meets the second face.

6. The light source device according to claim 5, wherein the sensor is disposed on a first face side of the first lens, and
   the second lens is:
   disposed on the first lens such that the fourth face and the second face adhere to each other; and
   not disposed between the first lens and the sensor.

7. The light source device according to claim 1, wherein the second lens is:
   a lens different from and separable from the first lens; and
   disposed on a center line of the first lens.

8. The light source device according to claim 7, wherein the first lens and the second lens are disposed symmetrical about the center line of the first lens.

9. The light source device according to claim 7, wherein the sensor is disposed on the center line of the first lens.

10. A light source device, comprising:
    a plurality of excitation light sources that emit primary light;
    a first lens that condenses the primary light, the first lens including a first face through which the primary light enters, and a second face opposite the first face from which the primary light that has entered from the first face and transmitted through an inside of the first lens exits;
    a wavelength converting member through which the primary light condensed by the first lens enters and which emits secondary light including the primary light and wavelength converted light, the wavelength converted light being at least some of the primary light on which wavelength conversion has been performed;
    a sensor; and
    a second lens disposed between the wavelength converting member and the first lens, the second lens including a third face having a curvature different from a curvature of the first face and the second face of the first lens, light which travels back from a wavelength converting member side toward the plurality of excitation light sources entering the third face and being condensed and directed to be incident on the sensor,
    wherein the sensor receives the light which travels back from the wavelength converting member side toward the plurality of excitation light sources via the second lens and the first lens to detect and anomaly in the wavelength converting member, and outputs information to a control device, and
    the plurality of excitation light sources are disposed near the sensor.

* * * * *